April 4, 1939.  B. L. DORSEY  2,152,879
FISHHOOK DISGORGER
Filed April 19, 1937
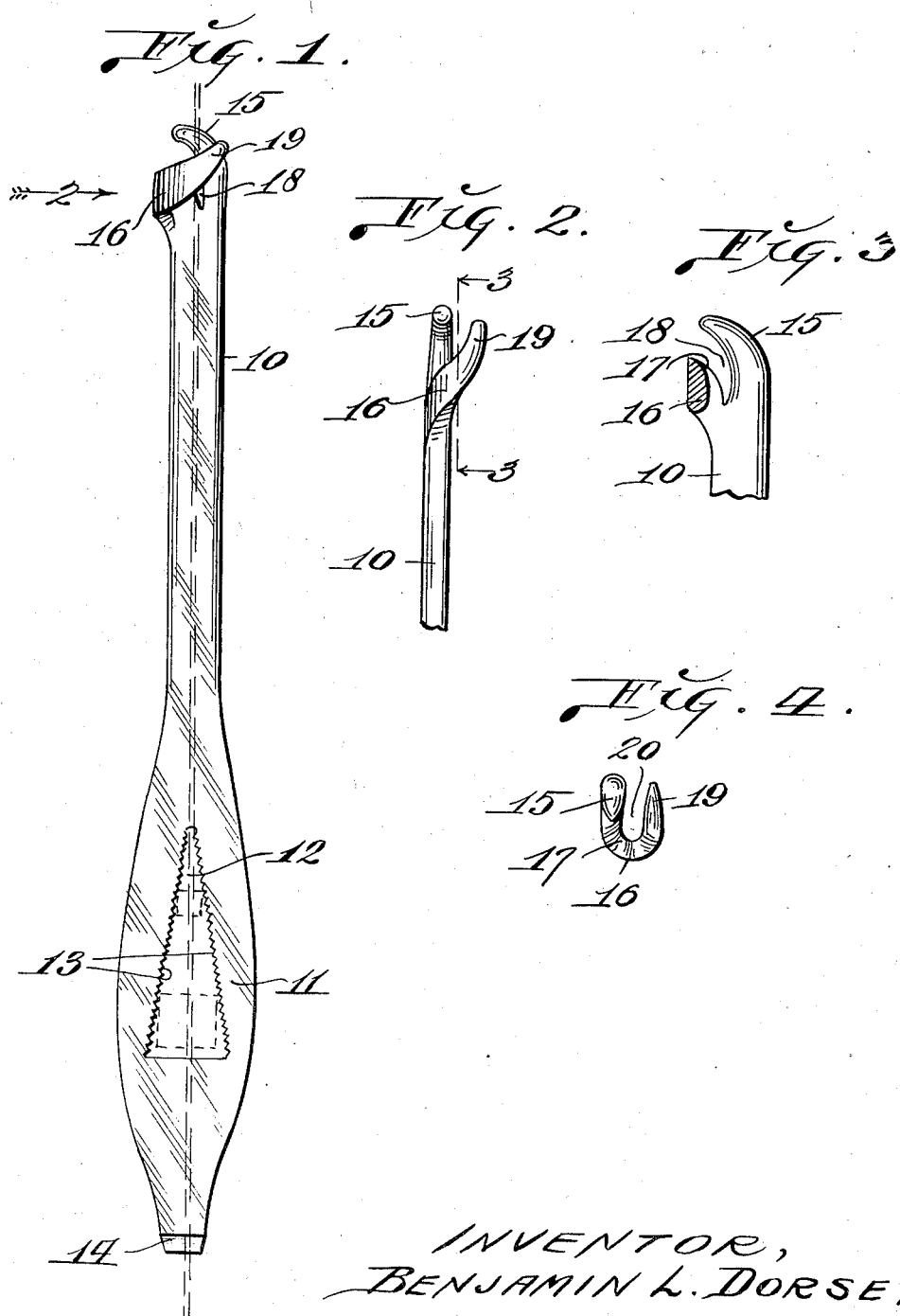
INVENTOR,
BENJAMIN L. DORSEY.
BY Martin P. Smith
ATTY.

Patented Apr. 4, 1939

2,152,879

UNITED STATES PATENT OFFICE 2,152,879

FISHHOOK DISGORGER

Benjamin L. Dorsey, Los Angeles, Calif.

Application April 19, 1937, Serial No. 137,741

7 Claims. (Cl. 43—29)

My invention relates to a fish hook disgorger, and has for its principal object the provision of a relatively simple, practical and inexpensive device that may be easily and expeditiously utilized for disgorging the hooks from fish, and particularly hooks that have been swallowed by the fish and which have become lodged in the gullet of the fish, or wherever the hook cannot be conveniently removed by finger manipulations.

A further object of my invention is to provide a fish hook disgorging device that is formed in a single piece and which device, after being guided into engagement with the hook by the leader or line to which said hook is connected, is rotated so as to disengage or release the hook from the fish and permit said hook to be withdrawn.

In many instances, pliers, knives and the like are utilized for disgorging hooks from the gullets of fish, and where such methods are employed the fish is frequently cut or torn so as to materially affect its appearance, as well as materially lowering its value when offered for sale, and it is one of the principal objects of my invention to provide a fish hook disgorging device that may be conveniently employed for quickly removing hooks from fish without materially affecting their appearance and without necessitating the cutting or tearing of any external portion of the fish.

A further object of my invention is to construct the handle portion of the disgorging device so that it may be conveniently used as a wrench for engaging different sized nuts or bolt heads on reels and other paraphernalia utilized by fishermen, and also a screw driver to be used on screws forming a part of fishermen's accessories.

With the foregoing and other objects in view my invention consists in certain novel features of construction and arrangements of parts that will be hereinafter more fully described and claimed and illustrated in the accompanying drawing, in which:

Fig. 1 is a side elevational view of a fish hook disgorging device constructed in accordance with my invention.

Fig. 2 is an elevational view of the end of the disgorging device seen looking in the direction indicated by the arrow 2 in Fig. 1.

Fig. 3 is an elevational view partly in section and taken on the line 3—3 of Fig. 2.

Fig. 4 is an end elevational view of the disgorging device.

Referring by numerals to the accompanying drawing which illustrates a preferred embodiment of my invention, 10 designates a straight shank that forms the body of the disgorging device, and the rear or lower end of said shank is enlarged to form a handle 11.

Formed in the handle portion of the device is an elongated tapered aperture 12, and the edges of the handle at the sides of said aperture are provided with fine teeth or corrugations 13 that are adapted to grip the edges of nuts or the heads of bolts for the purpose of screwing and unscrewing the same from fishing accessories such as reels.

The tapering of the aperture 12 from one end to the other provides for the accommodation and engagement of nuts or bolt heads of different sizes.

The end of the handle terminates in a bit or blade 14 that may be inserted in the slot of a screw for the purpose of rotating same.

The forward or upper end of the shank 10 terminates in a short curved finger 15 that gradually tapers toward its end and, for convenience in operation, the surface of this finger is rounded and smooth.

Formed integral with the edge of the shank 10, immediately in front of and below the finger 15, is a laterally and upwardly projecting hook 16 that is substantially U-shaped when viewed in plan, as illustrated in Fig. 4.

The upper edge of hook 16 is curved or beveled, as designated by 17, in order to facilitate the engagement of said hook with the line or leader that is connected to the hook that has become lodged in the fish gullet, and as said hook projects upwardly and laterally in front of the finger, a narrow curved notch 18 is formed between said finger and said hook, which notch gradually decreases in width toward its lower end.

The upper terminal portion 19 of the hook 16 occupies a plane substantially parallel with and spaced a slight distance apart from the finger 15, thereby providing a narrow slot or opening 20 between the finger and hook.

In the manipulation of my improved device for disgorging a fish-hook, the implement is positioned so that the leader or line to which the hook is attached, extends through the slot 20 between the finger 15 and hook 16, with said line or leader extending longitudinally on one of the side faces of the implement and lengthwise across the opening 12.

The end of the implement having the finger 15 and hook 16 is positioned several inches away from the mouth of the fish in which the hook is embedded and the line or leader is drawn taut by pulling strains impressed thereon by one of the hands of the user of the device.

The operator grips the handle 11 and in so doing presses that portion of the leader or line that extends lengthwise of the aperture 12 into the leader so as to more firmly hold the implement in proper operative position with respect to the leader or line.

The forward end of the implement is now moved along the leader or line into and through the mouth of the fish and down the gullet, during which operation the line or leader is held taut from a point behind the implement with said leader or line passing between the handle and the hand that grips the same.

When the forward end of the implement engages the shank of the hook, the implement is rotated and pressed against the hook so that the curved end thereof that carries the barb will pass into the notch 18 with the barbed portion of the hook that is embedded in the fish's gullet projecting through notch 18 beyond finger 15 and hook 16 and as the implement is further rotated with pressure against the fish the hook will be twisted free from the tissues in which it has been imbedded and the implement and hook are now withdrawn from the fish.

As the implement is used for twisting the engaged hook as just described, said implement should be continuously pressed against the fish and during the rotary or twisting movement, the ends of finger 15 and hook 16 will press or bear with considerable pressure against the tissues immediately surrounding the embedded portion of the hook and such action greatly facilitates the disgorging operation.

The curving or beveling of the upper edge of hook 16 greatly facilitates the movement of the bifurcated end of the implement past the eye of the embedded hook and past the loop of the line or leader that is connected to said eye.

Thus it will be seen that I have provided a fish-hook disgorging device that is relatively simple in construction, inexpensive of manufacture and very effective in performing the functions for which it is intended.

Where the implement is utilized for disgorging hooks that are carried by leaders of wire or gut, the latter are not unduly bent or kinked during the disgorging operation and as the forward end of the implement engages and acts directly upon the hook that is imbedded in the fish's gullet, said hook is very easily and quickly removed from the fish without external mutilation thereof.

The opening 12, which functions as a wrench, and the screw driver point or bit 14 provide convenient accessories that may be used while taking apart, adjusting and assembling reels and like fishing accessories.

It will be understood that minor changes in the size, form and construction of the various parts of my improved fish-hook disgorger may be made and substituted for those herein shown and described without departing from the spirit of the invention, the scope of which is set forth in the appended claims.

I claim as my invention:

1. A fish disgorging implement comprisng a shank, a curved finger on one end of said shank and lying in the same plane therewith, and an upwardly and laterally projecting hook formed on said shank in front of said finger the terminal portion of which hook occupies a plane spaced apart from and parallel with said shank and curved finger and projecting in the opposite direction from said finger.

2. A fish disgorging implement comprising a shank, a curved finger on one end of said shank and lying in the same plane therewith, an upwardly and laterally projecting hook formed on said shank in front of said finger, the terminal portion of which hook occupies a plane spaced apart from and parallel with said shank and curved finger and projecting in the opposite direction from said finger and there being a curved tapered notch formed between said finger and hook.

3. A fish disgorging implement comprising a shank, a curved finger on one end of said shank and lying in the same plane therewith, an upwardly and laterally projecting hook formed on said shank in front of said finger, the terminal portion of which hook occupies a plane spaced apart from and parallel with said shank and curved finger and projecting in the opposite direction from said finger and the upper inner edge of which hook is curved or beveled inwardly.

4. A fish disgorging implement comprising a shank, a curved finger on one end of said shank and lying in the same plane therewith, an upwardly and laterally projecting hook formed on said shank in front of said finger, the terminal portion of which hook occupies a plane spaced apart from and parallel with said shank and curved finger and projecting in the opposite direction from said finger there being a curved tapered notch formed between said finger and hook, and the upper inner edge of which hook is curved or beveled inwardly.

5. A fish hook disgorging implement comprising a straight shank, the forward end of which is bifurcated to provide a curved finger that projects forwardly from the end of said shank to one side of the medial line thereof and in the same plane therewith, and a hook on the opposite side of said shank directly below and in front of said curved finger, said hook extending from said shank upwardly and outwardly in the same direction with said curved finger, thence laterally and thence upwardly to the side of said curved finger and projecting in the opposite direction therefrom with the terminal portion of said hook spaced apart from and occupying a plane substantially parallel with the plane occupied by said curved finger and said shank.

6. A fish hook disgorging implement comprising a straight shank, the forward end of which is bifurcated to provide a curved finger that projects forwardly from the end of said shank to one side of the medial line thereof and in the same plane therewith, and a hook on the opposite side of said shank directly below and in front of said curved finger, said hook extending from said shank upwardly and outwardly in the same direction with said curved finger, thence laterally and thence upwardly to the side of said curved finger and projecting in the opposite direction therefrom, with the terminal portion of said hook spaced apart from and occupying a plane substantially parallel with the plane occupied by said curved finger and said shank and there being a tapered curved notch formed between said curved finger and the end of the hook that is connected to said shank.

7. A fish hook disgorging implement comprising a straight shank, the forward end of which is bifurcated to provide a curved finger that projects forwardly from the end of said shank to one side of the medial line thereof and in the same plane therewith, and a hook on the opposite side of said shank directly below and in front of said curved finger, said hook extending from said shank upwardly and outwardly in the same direction with said curved finger, thence laterally and thence upwardly to the side of said curved finger and projecting in the opposite direction therefrom, with the terminal portion of said hook spaced apart from and occupying a plane substantially parallel with the plane occupied by said curved finger and said shank, there being a tapered curved notch formed between said curved finger and the end of the hook that is connected to said shank and the upper edge of the intermediate portion of said curved hook being bevelled inwardly and downwardly.

BENJAMIN L. DORSEY.